Patented Sept. 15, 1953

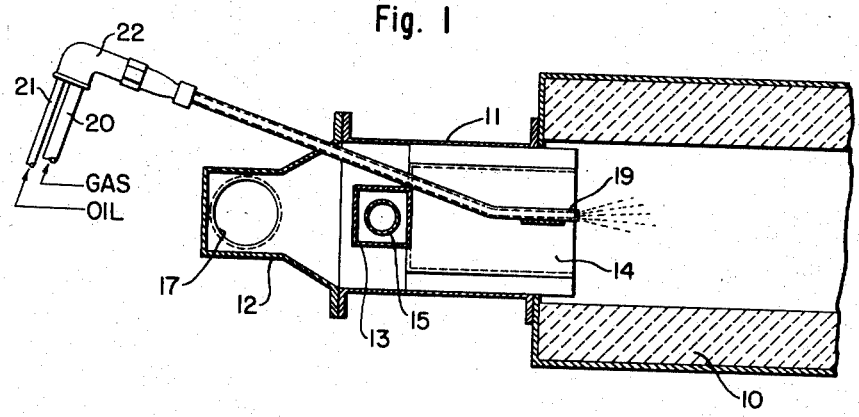
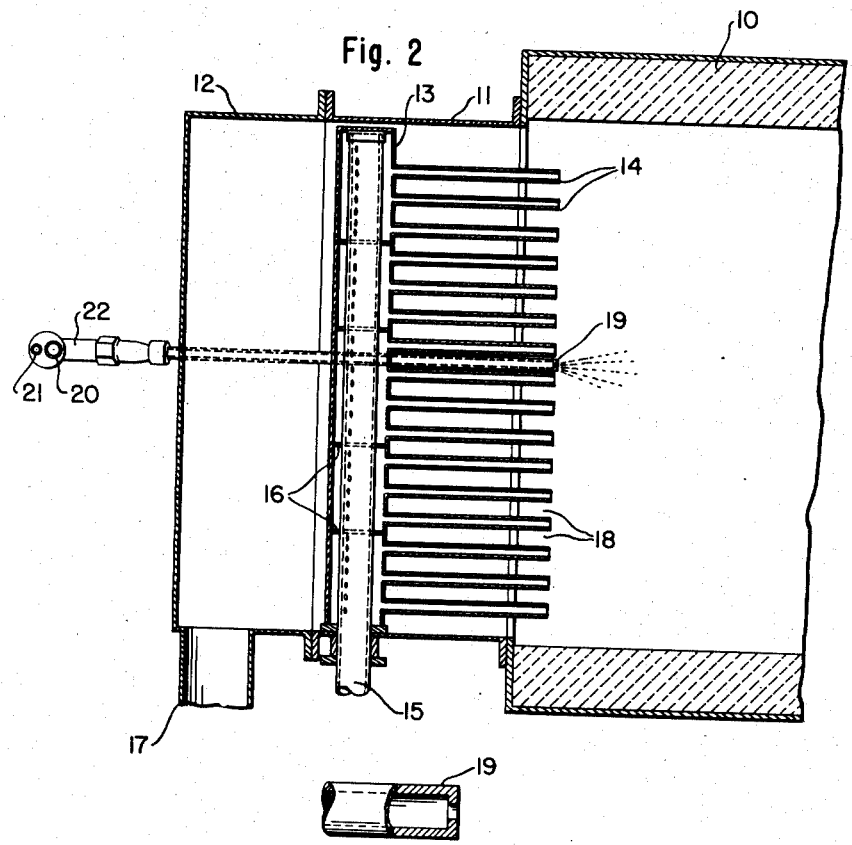

2,652,313

UNITED STATES PATENT OFFICE 2,652,313

MANUFACTURE OF FURNACE CARBON BLACK

William L. Loving, Pampa, Tex., assignor to Godfrey L. Cabot, Inc., Boston, Mass., a corporation of Massachusetts Application April 3, 1951, Serial No. 218,983

3 Claims. (Cl. 23—209.8)

This invention consists in a novel process of making carbon black of high grade from gas and hydrocarbon oil, and includes within its scope a novel furnace organization whereby the said process may be advantageously carried out.

At the present time a substantial percentage of the current production of carbon black consists of soft black designated in the industry as semireinforcing furnace (SRF). For the production of such black the so-called General Atlas type process as generally described in U. S. Letters Patent No. 1,904,469, Keller, for example, has never been surpassed in efficiency. That process is characterized by the steps of flowing a plurality of alternate contiguous thin streams of air and hydrocarbon gas in the same general direction and in non-turbulent flow into a furnace under conditions of incomplete combustion wherein large particle size carbon black is produced at high yield.

The process of the present invention is in one aspect an improvement in the General Atlas type process and in another aspect is a process of more general application. It is characterized by supplying in a definite and carefully selected zone of the burning air-gas mixture a spray of atomized hydrocarbon oil. By my improved process, it is entirely practicable to increase the total carbon black output as much as 50% when the proper amount of oil is supplied, as compared to the output of the process carried out under otherwise identical conditions.

Another important and unexpected advantage of my invention is that atomized oil may be supplied as above explained without significantly altering the quality of black produced while greatly increasing production rates. This is the more surprising because if oil alone is used as the raw material for carbon black regardless of the type of burner employed no product similar to a gas black is produced but instead the product is of typical oil black quality.

Moreover, the novel process of my invention is flexible to the extent that it permits a wide variation of operating conditions of which advantage may be taken to maintain a uniform product regardless of changes in the composition of gas available, or to produce carbon black of various different properties as the trade may require.

These and other features of the invention will be best understood and appreciated from the following description of a preferred embodiment of apparatus which may be employed in carrying out the improved process as shown in the accompanying drawings in which:

Fig. 1 is a plan view of a portion of a furnace with parts shown in horizontal section;

Fig. 2 is a corresponding view in vertical section, and

Fig. 3 is a fragmentary view of the oil nozzle.

The furnace 10 has refractory insulating walls enclosed in a steel casing and provides an enclosed combustion space in which the carbon black is formed and from which it is carried with the products of combustion to be quenched and separated by conventional apparatus and procedure which it is not necessary to illustrate or describe herein.

To the inlet end of the furnace is secured a flanged burner box 11 which, at its outer end is provided with a sheet metal casing 12 providing an air chamber. Within the burner box is provided a rectangular manifold 13 arranged to supply a series of thin flat gas ducts 14 which extend from the manifold a short distance into the furnace space. Operating furnaces may contain any convenient number of ducts having slotted openings to provide an effective gas layer thickness of preferably ½ inch or less and being about 9" or 10" wide, uniformly spaced and discharging into an elongated, unobstructed combustion space. Gas is supplied to these ducts by a vertical pipe 15 which enters the manifold 13 through a gastight gland and is furnished with a multiplicity of small outlet apertures. The manifold itself as herein shown is divided into substantially equal sections by horizontal partitions 16 which tend to insure uniform pressure and distribution of gas to the corresponding gas ducts 14.

Sheets of air enter the combustion chamber from slots or spaces 18 between the gas burner ducts 14. The spaces which lie between the adjacent ducts 14 serve as air passages on both sides of each gas duct and distribute air for combustion equally between all the gas ducts. By this burner construction the sheets of air and gas supplied to the furnace are directed in parallel streamline flow as they come into contact with one another within the combustion chamber.

In operation the gas and air flow into the combustion chamber in alternate continuous thin streams, burning taking place essentially at the interfaces of the streams. Because of the condition of relatively low turbulence in this method of gas introduction diffusion of air and combustion gases into the raw material gas is slow, reaction is prolonged and particle growth continuous for an appreciable period of time, resulting in a carbon black product consisting of relatively large particles.

Inasmuch as high yield of satisfactory quality carbon black is an important feature of this General Atlas type process, it is operated with as low a ratio of the volume of air to gas as is consistent with good furnace operation and good quality. Too low an air-gas ratio results in tabulated data all flow rate and production figures are on a single burner basis.

| | Gas, cu. ft./hr. | | | Oil, gal./hr. | Production in lbs./hr. | | | Yields | |
|---|---|---|---|---|---|---|---|---|---|
| | Thru Ducts | Thru Nozzle | Total | | From Gas | From Oil | Total | From Gas, #/MCF | From Oil, #/Gal. |
| 1 | 8,250 | 0 | 8,250 | 0 | 73.8 | 0 | 73.8 | 9.0 | |
| 2 | 7,070 | 430 | 7,500 | 5.7 | 67.5 | .3 | 67.8 | 9.0 | negligible. |
| 3 | 7,140 | 430 | 7,570 | 11.0 | 68.2 | 41.2 | 109.4 | 9.0 | 3.7 |
| 4 | 7,080 | 430 | 7,510 | 11.0 | 67.5 | 34.3 | 101.8 | 9.0 | 3.1 |
| 5 | 7,080 | 430 | 7,510 | 11.0 | 67.5 | 35.7 | 103.2 | 9.0 | 3.2 |
| 6 | 7,080 | 430 | 7,510 | 12.0 | 67.5 | 39.4 | 106.9 | 9.0 | 3.3 | furnace temperatures insufficient for proper dissociation of the gas to carbon black and the product contains considerable tarry hydrocarbons. Such operation may also be accompanied by a deposit of carbon on the furnace chamber walls. Too high an air-gas ratio results in combustion of a higher percentage of the gas fed to the furnace and in decreased yield with no improvement in quality. In practice, we find that air-gas ratios between 4.5 to 1 and 6.0 to 1 are most suitable. Even at the best air-gas ratio consistent with good quality, and under which conditions a minimum of gas is being consumed to provide heat to dissociate the remainder of the gas to carbon black, it is rarely possible in this, the best of gas furnace processes from a yield standpoint, to achieve yields of more than about 30% of the total carbon fed to the furnace in the form of natural gas.

As I have said, production of typical quality gas black can be greatly increased by introducing oil into the furnace in the center of the burner duct pattern. An oil nozzle 19 is herein shown as located in the air space at the center of the gas duct pattern and terminates in the plane of the termination of the gas and air ducts. This center location and termination point is critical. The oil nozzle is shown as constricted at its delivery end and is adapted to deliver a fine spray of atomized oil in conical pattern. An oil-gas mixture or oil alone is supplied to the nozzle 19 by a pipe which is led obliquely through the burner box 11. This pipe is shown as connected through an atomizing chamber 22 to a pipe 20 for gas which may be natural gas, air or any other suitable atomizing gas and a pipe 21 for oil. High gas pressures are not necessary and satisfactory atomization of the heaviest tars and residual oils may be readily effected at pressures between about 25 and 75 pounds per square inch. The shape and velocity of the oil spray, the degree of atomization and the composition of the atomizing gas are all interrelated factors which combine to effect the desired dissociation reaction of the oil and the formation of carbon black. When a furnace has several burners as is the case with a commercial installation each burner will, of course, have its own oil nozzle centered in the burner duct pattern.

The high precision of control available in the process of this invention results from the very close juxtaposition of the burning gas sheets to the oil spray and the scope afforded by gas atomization.

The following typical runs on commercial equipment containing a total of 16 burners indicate the very desirable results secured by the process of this application. In the following Run 1 above represents typical operation on gas with no atomized oil added and a yield of 9.0 lbs. carbon black per MCF gas fed is indicated. Therefore, in all other runs, when atomized oil was added, a yield value of 9.0 lbs. per MCF was credited for all gas used, both through gas ducts and used for atomization of oil, and the additional production above that calculated from gas was assumed to come from the oil feed.

The runs above described indicate the favorable and practical range of about 1 to 2 gals. of oil in the spray per 1000 cu. ft. of gas, and that when the spray is supplied under the conditions defined the carbon black yield may be increased by almost as much as 50%. An important advantage of my novel process is that when the burner is designed and operated to produce a high grade of furnace black, atomized oil may be added and the same quality of black will be produced at the greatly increased rate of yield above noted.

Having thus disclosed my invention and described in detail an illustrative embodiment thereof, I claim as new and desire to secure by Letters Patent:

1. The process of making furnace carbon black, which includes the steps of admitting a plurality of alternate continuous relatively thin vertically extending parallel layers of air and gas in streamline non-turbulent flow under conditions of incomplete combustion into a single elongated unobstructed combustion space, thereby causing burning to take place at the interfaces of the air and gas layers with decomposition of the unconsumed gas while in free space, injecting into the combustion space in a substantially central position with respect to the pattern of the air and gas layers a fine spray of hydrocarbon oil which has been atomized by gas in a divergent conical body and which is immediately surrounded by burning non-turbulent air-gas streams, and collecting the unconsumed carbon particles from the products of combustion.

2. The process defined in claim 1 further characterized in that the hydrocarbon oil is supplied at a rate between 1 and 2 gallons per 1000 cu. ft. of gas.

3. The process defined in claim 1 further characterized in that the air-gas volume ratio employed is between 4.5 to 1 and 6 to 1.

WILLIAM L. LOVING.

References Cited in the file of this patent

UNITED STATES PATENTS

| Number | Name | Date |
|---|---|---|
| 2,144,971 | Heller et al. | Jan. 24, 1939 |
| 2,499,438 | Wiegand et al. | Mar. 7, 1950 |
| 2,553,199 | Loving | May 15, 1951 |